(12) United States Patent
Fletcher

(10) Patent No.: US 11,259,529 B2
(45) Date of Patent: Mar. 1, 2022

(54) BAKING TRAY

(71) Applicant: Bitezies, Inc., Alpharetta, GA (US)

(72) Inventor: Rachel M. Fletcher, Alpharetta, GA (US)

(73) Assignee: BITEZIES, INC., Lewes, DE (US)

( * ) Notice: Subject to any disclaimer, the term of this patent is extended or adjusted under 35 U.S.C. 154(b) by 39 days.

(21) Appl. No.: 16/405,957

(22) Filed: May 7, 2019

(65) Prior Publication Data

US 2019/0373901 A1    Dec. 12, 2019

Related U.S. Application Data

(60) Provisional application No. 62/682,155, filed on Jun. 7, 2018.

(51) Int. Cl.
| | |
|---|---|
| *A21B 5/00* | (2006.01) |
| *A47J 37/01* | (2006.01) |
| *B65D 1/36* | (2006.01) |
| *A23L 5/10* | (2016.01) |
| *A21D 13/80* | (2017.01) |

(52) U.S. Cl.
CPC ............... *A21B 5/00* (2013.01); *A21D 13/80* (2017.01); *A23L 5/15* (2016.08); *A47J 37/01* (2013.01); *B65D 1/36* (2013.01); *A23V 2002/00* (2013.01)

(58) Field of Classification Search
CPC ... A21B 5/00; A47J 37/01; B65D 1/36; B65D 25/04
See application file for complete search history.

(56) References Cited

U.S. PATENT DOCUMENTS

| | | |
|---|---|---|
| D5,132 S | 7/1871 | Reid |
| 311,445 A | 1/1885 | Philippart |
| 2,236,675 A | 4/1941 | De Reamer |
| 3,613,554 A * | 10/1971 | Koger ............... A47J 37/00 99/446 |
| 4,127,547 A | 11/1978 | Smarook |
| 4,176,591 A | 12/1979 | Power |

(Continued)

FOREIGN PATENT DOCUMENTS

| | | |
|---|---|---|
| CA | 2829726 | 4/2015 |
| CN | 201533553 | 7/2010 |

(Continued)

OTHER PUBLICATIONS

Bitezies, announced Jan. 31, 2020 [online], retrieved Aug. 14, 2020, retrieved from internet, https://www.facebook.com/biteziespage, 9 pgs.

(Continued)

*Primary Examiner* — Stephen J Castellano
(74) *Attorney, Agent, or Firm* — Taylor English Duma LLP

(57) ABSTRACT

Example aspects of a baking tray and a method for using a baking tray are disclosed. The baking tray can comprise a baking tray body; and a baking cup formed in the baking tray body, the baking cup defining a baking cavity and an aperture formed through the baking cup. The method can comprise providing a baking tray, the baking tray comprising a baking cup formed in a baking tray body, the baking cup defining a baking cavity and an aperture formed through the baking cup; inserting a dough into the baking cavity; and baking the dough in the baking tray to form a baked good.

17 Claims, 11 Drawing Sheets

(56) References Cited

U.S. PATENT DOCUMENTS

| | | | |
|---|---|---|---|
| D274,781 S | 7/1984 | Baker et al. | |
| D275,366 S | 9/1984 | Maxwell | |
| 4,666,162 A | 5/1987 | Campbel | |
| D324,823 S | 3/1992 | Scarpa et al. | |
| D326,830 S | 6/1992 | Vaughn | |
| 5,277,874 A | 1/1994 | Vasta | |
| D369,508 S | 5/1996 | Jones et al. | |
| 5,681,189 A | 10/1997 | Dunham | |
| 5,919,508 A | 7/1999 | Donnelly et al. | |
| 5,970,653 A | 10/1999 | Liang et al. | |
| D419,914 S | 2/2000 | Weder et al. | |
| D440,820 S | 4/2001 | Yamazumi | |
| D447,001 S | 8/2001 | Yamazumi | |
| 6,279,469 B1 | 8/2001 | Bailey | |
| D461,677 S | 8/2002 | Bradley | |
| 6,431,059 B1 | 8/2002 | Castellani | |
| D471,888 S | 3/2003 | Solland | |
| 6,793,193 B2 | 9/2004 | De Groote | |
| D529,391 S | 10/2006 | Glass | |
| D557,572 S | 12/2007 | Kirsch | |
| D571,851 S | 6/2008 | Myers | |
| D578,829 S | 10/2008 | Freeman | |
| D586,663 S | 2/2009 | Tidqvist | |
| D587,116 S | 2/2009 | Landry | |
| D596,231 S | 7/2009 | Hung | |
| D611,562 S | 3/2010 | Sjoberg | |
| D611,563 S | 3/2010 | Sjoberg | |
| D616,269 S | 5/2010 | Kulzer | |
| D634,761 S | 3/2011 | Sicurelli | |
| D649,987 S | 12/2011 | Dunnahoe | |
| D689,326 S | 9/2013 | Ortegon et al. | |
| D689,328 S | 9/2013 | Hollinger | |
| D693,181 S | 11/2013 | Chase | |
| D699,084 S | 2/2014 | Miller et al. | |
| D708,891 S | 7/2014 | Smallegan | |
| D710,202 S | 8/2014 | Bates et al. | |
| D711,680 S | 8/2014 | Masse | |
| D726,513 S | 4/2015 | Zila | |
| D738,943 S | 9/2015 | Dodds et al. | |
| D740,156 S | 10/2015 | Merbeth | |
| D792,277 S | 7/2017 | Davis | |
| D792,735 S | 7/2017 | Henry | |
| D793,799 S | 8/2017 | Dunne | |
| D819,094 S | 5/2018 | Hume | |
| D875,552 S | 2/2020 | Tayara | |
| D880,542 S | 4/2020 | Burns | |
| D882,355 S | 4/2020 | Seuferer | |
| D885,912 S | 6/2020 | Silva | |
| 2004/0182989 A1 | 9/2004 | De Buyer | |
| 2009/0113815 A1 | 5/2009 | Woodcock | |
| 2009/0123625 A1* | 5/2009 | Shannon | A21B 3/132 426/523 |
| 2013/0099649 A1 | 4/2013 | Snyder | |
| 2014/0065273 A1* | 3/2014 | Krupa | A21B 3/131 426/393 |
| 2015/0265095 A1 | 9/2015 | Fernando | |

FOREIGN PATENT DOCUMENTS

| | | |
|---|---|---|
| CN | 202035417 | 11/2011 |
| FR | 2643545 | 8/1990 |
| FR | 2912286 | 8/2008 |
| WO | 1998014063 | 4/1998 |
| WO | 2009029435 | 3/2009 |
| WO | 20190236241 | 12/2019 |

OTHER PUBLICATIONS

Ali Express; Article entitled: "Diamond Jewel Gem Shape Silicone Chocolate Mold", announced © 2010-2020 [online], retrieved Aug. 14, 2020, retrieved from internet, https://www.aliexpress.com/item/32793420568.html, 6 pgs.

Fletcher, Rachel M.; Non-Final Office Action for Design U.S. Appl. No. 29/690,392, filed May 7, 2019, dated Aug. 19, 2020, 22 pgs.

KIKUU Online Shopping; Article entitled: "PF Silicone mold Creative diamond silicone ice tray mold", announced © 2019 [online], retrieved Aug. 14, 2020, retrieved from internet, https://kikuu.com/item-1823827-pf-silicone-mold-creative-diamond-silicone-ice-tray-mold-15-grid-three-dimensional-silicone-ice-tray-ice-box.html, 7 pgs.

Christines Molds; Article entitled: "Pyramid Silicone Chocolate Mold", announced © 2020 [online], retrieved Aug. 14, 2020, retrieved from internet, https://www.christinesmolds.ca/pyramid-silicone-chocolate-mold/, 4 pgs.

"Derby Day Inspiration at Macy's and a Pecan Sandies Shortbread Recipe" (Liza) (online) (retrieved from the internet on Aug. 25, 2019) <URL viewsfromtheville.com/2017/04/27/pecan-sandies-shortbread-macys/> May 8, 2017 (May 8, 2017), entire document, especially p. 1-2, 5 pgs.

"Raspberry Shortbread Cakes" (Nordicware (registered trademark)) [online} (retrieved from the internet on Aug. 25, 2019) <URL nordicware.com/recipe/raspberry-shortbread-cakes/> Dec. 18, 2017, (Dec. 18, 2017); entire document, especially fig. 1-2; entire text on p. 2, 3 pgs.

"Vintage butter or chocolate mold" (BranchBellDesigns) [online] (retrieved from the internet on Aug. 26, 2019), <URL https://www.etsy.com/listing/86816930/vintage-butter-or-chocolate-mold?show_sold_out_detail=1 > Sep. 8, 2012 (Sep. 8, 2012), entire document, especially fig. 1, 1 pg.

Fletcher, Rachel M.; International Search Report and Written Opinion for PCT Application No. PCT/US19/31460, filed May 9, 2019, dated Sep. 17, 2019, 12 pgs.

Fletcher, Rachel M.; Invitation to Correct Defects for PCT/US19/31460, filed Jun. 7, 2018, dated Jul. 8, 2019, 2 pgs.

Fletcher, Rachel M.; Non-Final Office Action for Design U.S. Appl. No. 29/690,393, filed May 7, 2019, dated Oct. 4, 2021, 37 pgs.

* cited by examiner

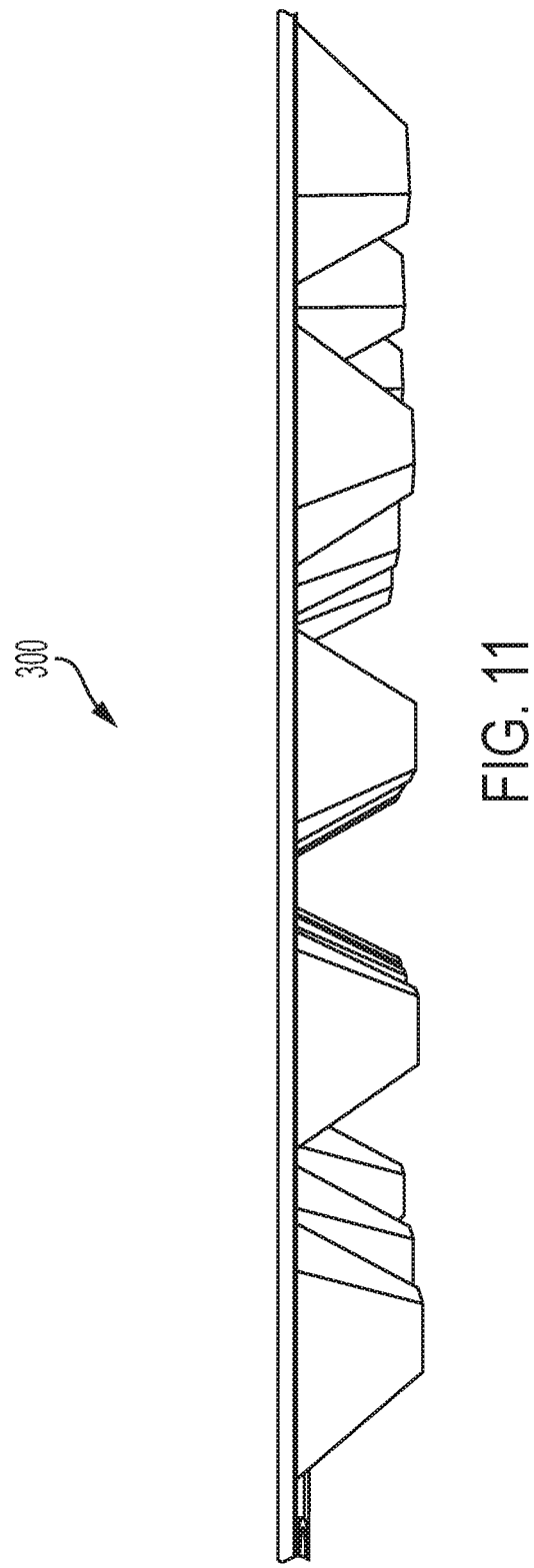

BAKING TRAY

CROSS-REFERENCE TO RELATED APPLICATIONS

The present application claims priority of U.S. Provisional Application No. 62/682,155, filed Jun. 7, 2018, which is hereby specifically incorporated by reference herein in its entirety.

TECHNICAL FIELD

This disclosure relates to baking. More specifically, this disclosure relates to a low-moisture baking tray and a method for using the same.

BACKGROUND

Traditional shortbread is known and desired for its dry, crumbly, rich buttery texture.

Traditional shortbread is not made with rising agents, so it is typically no thicker than five-eighth (5/8) inches. Existing traditional shortbread is typically relatively simple in shape, as there is no existing low-moisture bakeware available to create complex-shaped shortbread in the traditionally known and desired dry, crumbly texture, as current bakeware does not allow sufficient dry heat to penetrate through a baking cup within which shortbread dough is received to make traditional shortbread in complex shapes. Furthermore, existing traditional shortbread is typically relatively flat on the top and bottom surfaces, since no rising agents are used in traditional shortbread so the traditional shortbread flattens as it bakes. The top surface of some existing traditional shortbread may include designs, but the top surface is still relatively flat. There is no existing bakeware or other tools available to make traditional shortbread in complex shapes, or make traditional shortbread that is substantially thicker than five-eighth (5/8) inches. Complex shapes can include, for example, polyhedrons such as tetrahedrons, octahedrons, and the like, frustum shapes, prisms such as triangular prisms, hexagonal prisms, and the like, rounded, curved, and spheroidal shapes, pyramids, cones, and the like.

Silicone bakeware exists for molding chocolate or baking cookies, cupcakes, muffins, or other baked goods. Such existing silicone bakeware is not desirable to use for making traditional shortbread in complex shapes, such as those mentioned above, because such bakeware retains moisture within the baking cups, which, when used to make traditional shortbread, prevents such shortbread from obtaining the desired traditional dry crumbly texture. For example, the baking cups within existing silicone bakeware can give traditional shortbread dough when baked within existing silicone bakeware, an undesirable moist texture instead, which is not desired in traditional shortbread. Furthermore, when using such existing silicone bakeware, the retained moisture within the cavities prevents the traditional shortbread dough from molding into complex shapes with the desired traditional, dry, crumbly shortbread texture.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a baking tray comprising a baking tray body; and a baking cup formed in the baking tray body, the baking cup defining a baking cavity and an aperture formed through the baking cup.

Also disclosed is a shortbread comprising a top shortbread surface; a bottom shortbread surface; and at least one side shortbread surface extending between the top shortbread surface and the bottom shortbread surface, wherein the shortbread defines a maximum width of at least 0.625 inches A method for using a baking tray is also disclosed, the method comprising providing a baking tray, the baking tray comprising a baking cup formed in a baking tray body, the baking cup defining a baking cavity and an aperture formed through the baking cup; inserting a dough into the baking cavity; and baking the dough in the baking tray to form a baked good.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 11 is a side view of the baking tray of FIG. 9.

DETAILED DESCRIPTION

Figure 1:
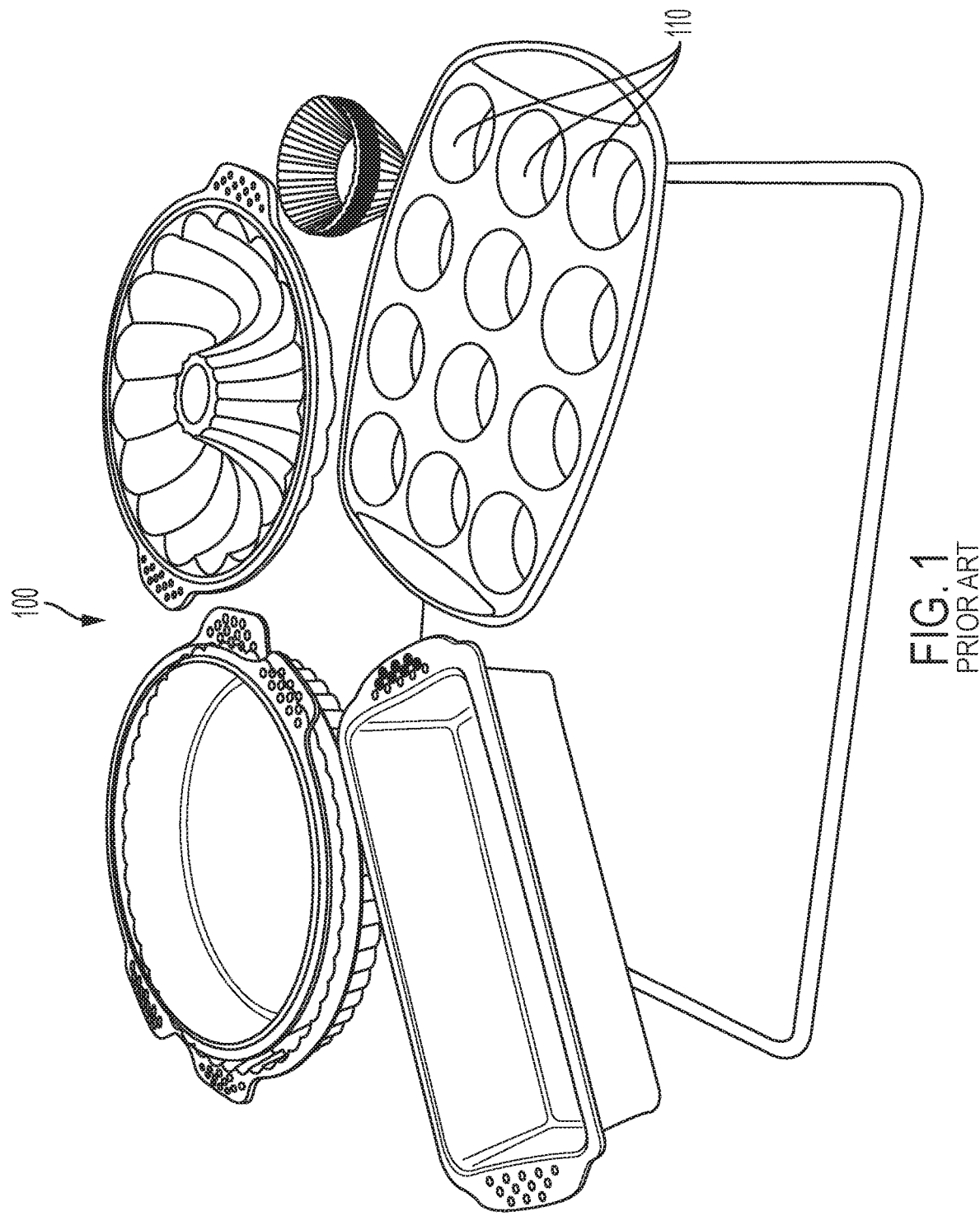
FIG. 1 is a perspective view of examples of existing silicone bakeware.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a baking tray and associated methods, systems, devices, and various apparatus. Example aspects of the baking tray can comprise at least one baking cup. The baking cup can define at least one aperture therethrough. It would be understood by one of skill in the art that the disclosed baking tray is described in but a few exemplary aspects among many. No particular terminology or description should be considered limiting on the disclosure or the scope of any claims issuing therefrom.

Implementations of the baking tray and a method using the same are provided. In some aspects, the baking tray can be a low-moisture baking tray. In some implementations, the baking tray can comprise a plurality of baking cups, each of the cups defining a cavity and an aperture or apertures formed through a baking cup surface of the baking cup, such as, for example, a bottom surface or side surface.

In some implementations, the baking tray can comprise silicone. In other implementations, the baking tray can comprise any other suitable material or combination of suitable materials.

In some implementations, the baking tray can be configured to bake shortbread dough into shortbread. In some implementations, the baking tray can be configured to bake any other suitable type of dough into any other suitable baked good.

In some implementations, the baking tray can be configured to bake traditional shortbread dough into traditional shortbread. In some implementations, the baking tray can be configured to bake any other suitable type of dough into any other suitable baked good.

In some implementations, the baking tray can be configured to bake traditional shortbread dough into traditional shortbread that has an increased thickness over prior art traditional shortbread while maintaining the dry crumbly texture of traditional shortbread. In some implementations, the thickness of the shortbread baked in the baking tray of the present disclosure is at least five eights (⅝ or 0.625) inches. In another aspect, the thickness of the shortbread baked in the baking tray is at least three-fourth (¾) inches. In some implementations, the increased thickness of the shortbread baked in the baking tray is greater than three-fourth (¾) inches and less than one (1) inch. In some implementations, the increased thickness of the shortbread baked in the baking tray is one (1) inch or greater. In some implementations, the thickness is less than five-eighths (⅝) inches. In some implementations, the thickness is the result of the corresponding complex shape formed.

In some implementations, the baking tray can be configured to bake shortbread dough into shortbread that has a complex shape while maintaining the dry crumbly texture of a flat or simple shaped shortbread. In example aspects, the shortbread can comprise a plurality of shortbread side surfaces. In some implementations, the complex shape of the shortbread baked in the baking tray can be a non-flat shape, wherein at least one of the shortbread side surfaces of the shortbread is not horizontal or vertical when the shortbread is placed on a horizontal support surface. In some implementations, the complex shape of the shortbread baked in the baking tray can be a frustum shape, and can define a pentagon or pentagon-like cross-sectional shape or can define a diamond, square, or diamond-like cross-sectional shape. In some implementations, the complex shape of the shortbread baked in the baking tray can include a polygon-shaped top shortbread surface and a polygon-shaped bottom shortbread surface, with a plurality of the side surfaces extending from the top shortbread surface to the bottom shortbread surface. In some implementations, the complex shape of the shortbread baked in the baking tray is any other suitable complex shape. In some other implementations, the complex shape of the shortbread baked in the baking tray can be a polyhedron such as a tetrahedron, an octahedron, and the like, a prism such as a triangular prism, a hexagonal prism, and the like, a spheroidal shape such as a sphere or ellipsoid, a pyramid, a cone, or any other suitable complex shape.

In this way, in some implementations, the baking tray can allow shortbread dough to be baked into shortbread comprising increased thickness over shortbread known in the prior art and/or a complex shape while maintaining the dry crumbly texture of thinner, flat, or simple shaped shortbread.

In some implementations, the baking tray can be configured to bake any other dough, batter, or other suitable or desirable substance.

FIG. 1 illustrates existing examples of silicone bakeware 100 known in the prior art. Such bakeware 100 exists for shaping chocolate and making cookies, cupcakes, muffins, or other baked goods. Teflon bakeware (not shown) also exists to make baked goods. Such existing bakeware is not desirable to use for making traditional shortbread in complex shapes, including spheroidal shapes, such as spheres and ellipsoids, because such existing bakeware retains moisture, which when used to make traditional shortbread, prevents the shortbread from obtaining the traditional desired dry crumbly texture and instead gives the shortbread an undesirable moist texture. That is, the retained moisture in existing bakeware baking cups 110 prevents the traditional shortbread dough from molding into shapes, especially that are thicker than ⅝ inches and/or are complex, whilst maintaining the traditional desired dry, crumbly texture of shortbread.

Figure 2:
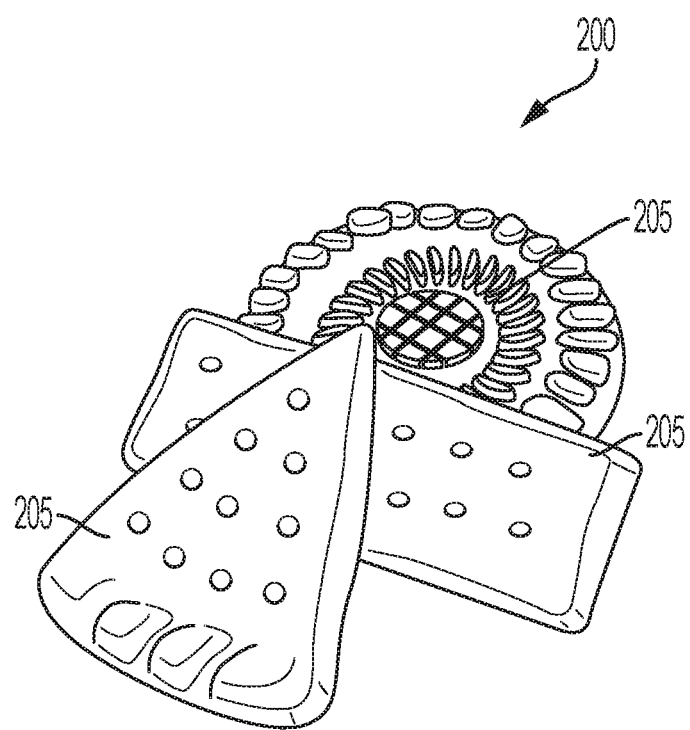
FIG. 2 is a perspective view of examples of existing shortbread.

FIG. 2 illustrates existing examples of traditional shortbread 200 known in the prior art.

Such traditional shortbread 200 is known and desired for its traditional, dry crumbly texture. Such traditional shortbread 200 is not made with rising agents, so the traditional shortbread is typically no thicker than five-eighths (⅝ or 0.625) inches. There is no existing traditional shortbread 200 available that is thicker or substantially thicker than five-eighths (⅝) inches or that is available in a complex shape. Such traditional shortbread 200 is typically relatively flat on a top shortbread surface 205 and a bottom shortbread surface (not shown) thereof, because rising agents traditionally are not used within traditional shortbread dough. Although the top shortbread surface 205 of some existing traditional shortbread 200 may include designs, the top shortbread surface 205 is typically still relatively flat.

Figure 3:
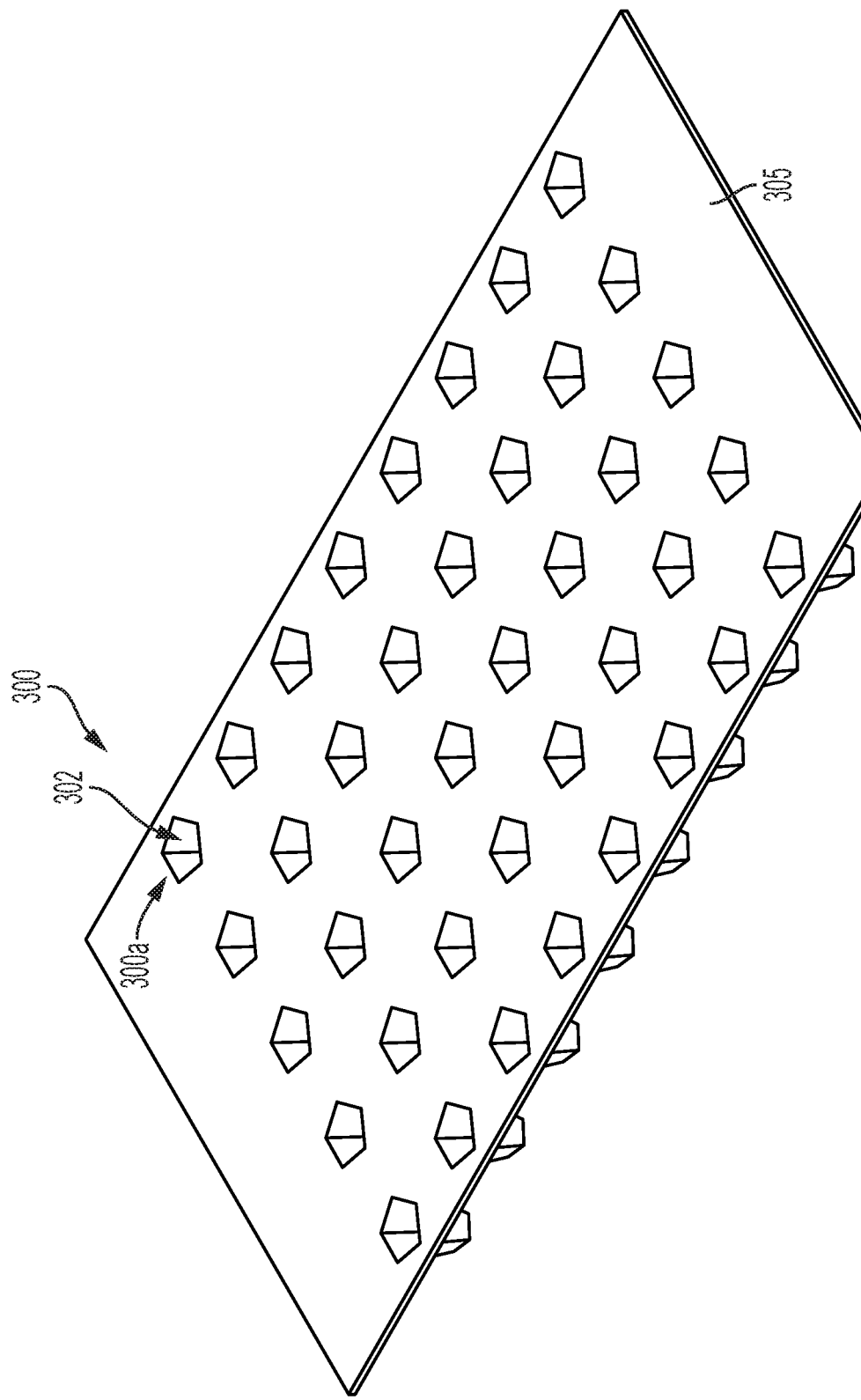
FIG. 3 is a top perspective view of a baking tray, according to one aspect of the present disclosure.
Figure 4:
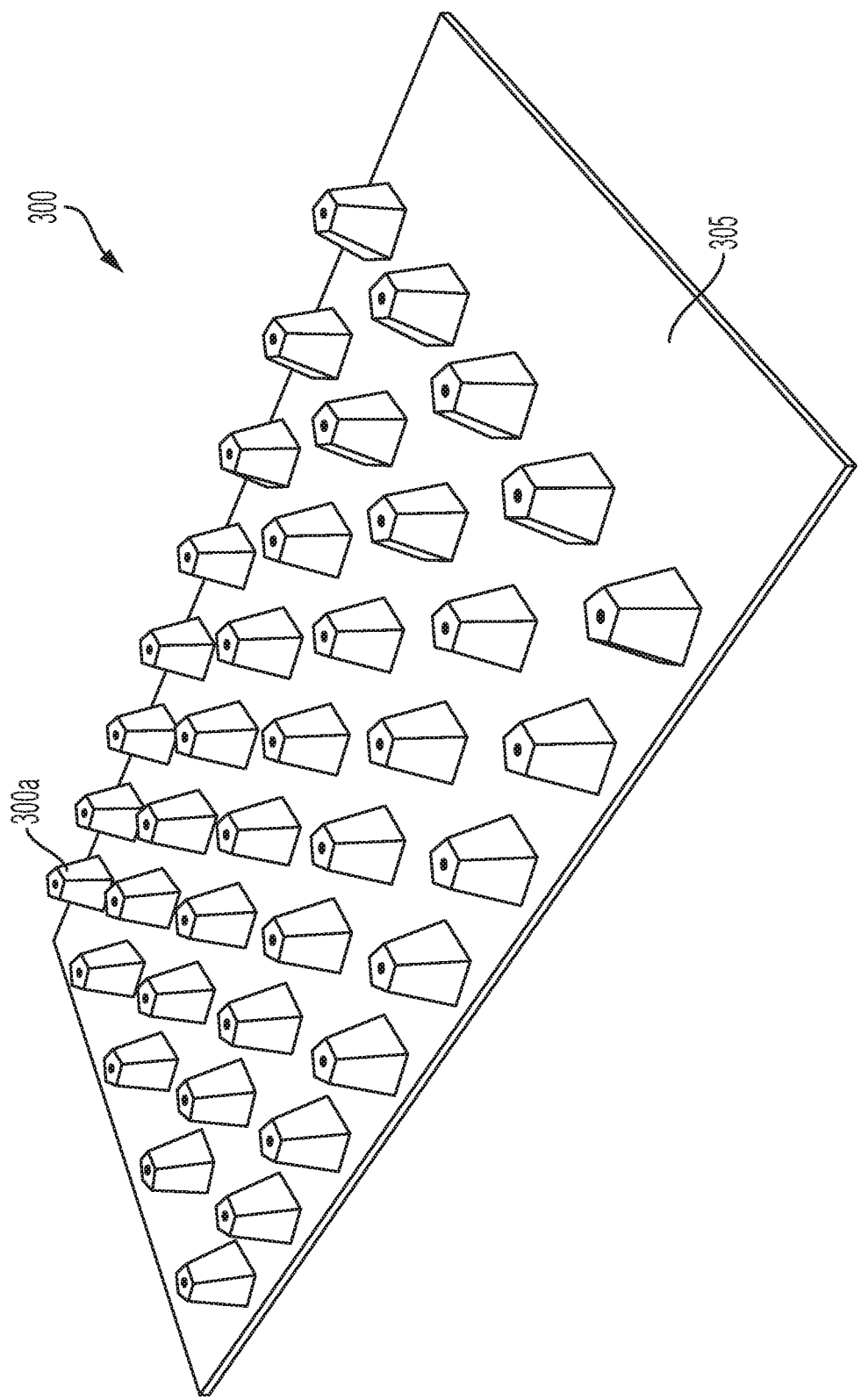
FIG. 4 is a bottom perspective view of the baking tray of FIG. 3.
Figure 5:
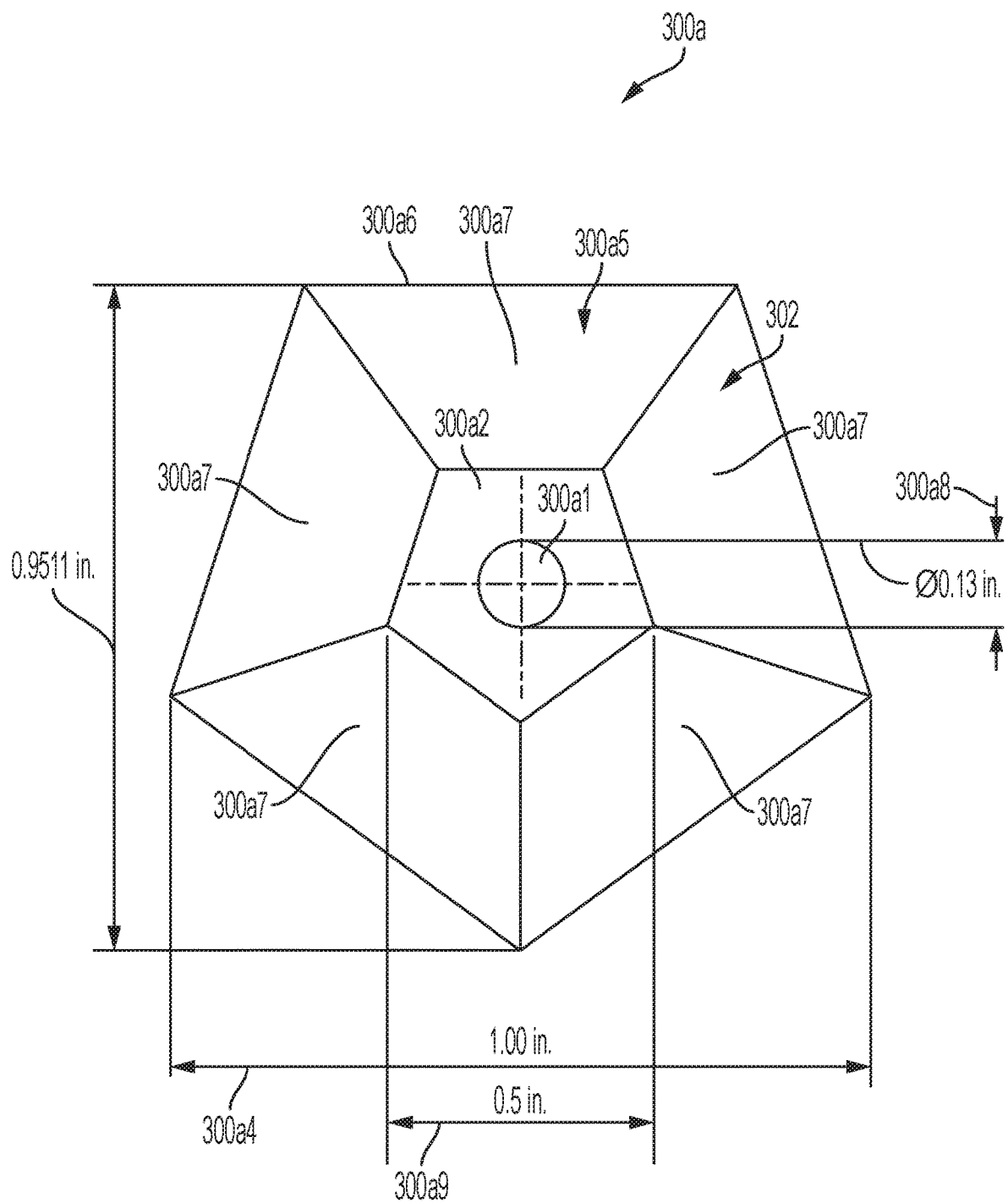
FIG. 5 is a top plan view of a cup of the baking tray of FIG. 3.
Figure 6:
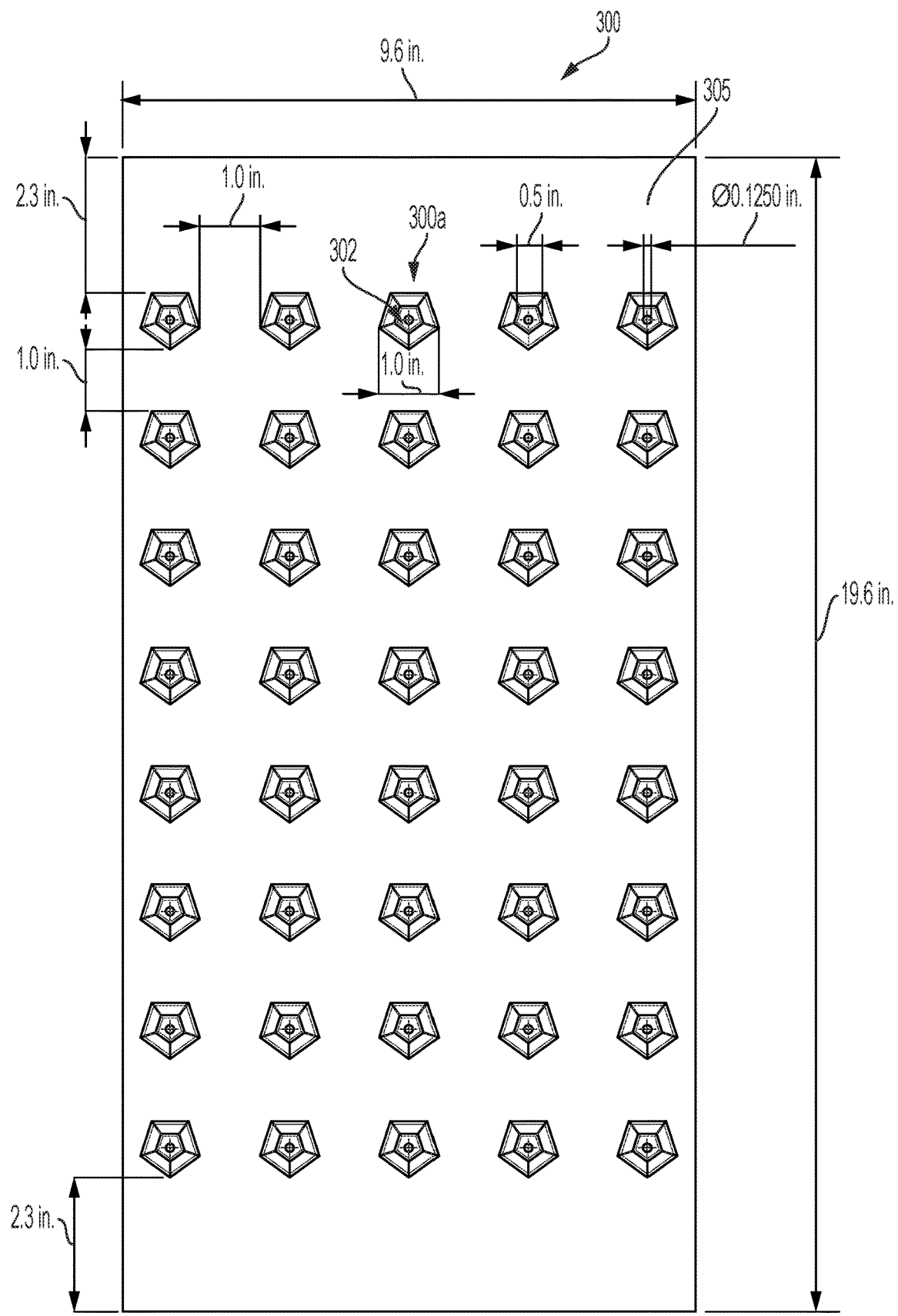
FIG. 6 is a top plan view of the baking tray of FIG. 3.

FIGS. 3-7 illustrate an implementation of an example baking tray 300 according to the present disclosure. Referring to FIG. 3, according to example aspects, the baking tray 300 can comprise a baking tray body 305 and one or more baking cups 300a formed in the baking tray body 305. In the present aspect, each of the baking cups 300a generally defines a pentagonal frustum shape. Referring to FIG. 5, each baking cup 300a can define a baking cavity 302 and can comprise a top opening 300a5 and at least one baking cup surface. For example, in the present aspect, each baking cup 300a can define a bottom surface 300a2 and at least one side surface 300a7 extending from the top opening 300a5 to the bottom surface 300a2. An aperture 300a1 can be formed through one of the bottom surface 300a2 and/or the at least one side surface 300a7. For example, in the present aspect, the aperture 300a1 can be formed through the bottom surface 300a2, as shown. In some implementations, the top opening 300a5 and bottom surface 300a2 can be pentagon shaped and each of the baking cups 300a can comprise five (5) of the side surfaces 300a7 extending from the top opening 300a5 to the bottom surface 300a2.

In some implementations, as shown in FIG. 5, a width of each of the baking cups 300a can vary (e.g., increase or decrease) across the baking cup 300a between the bottom surface 300a2 and the top opening 300a5. For example, in the present aspect, the width of the baking cup 300a can increase across the baking cup 300a from the bottom surface 300a2 to the top opening 300a5. In other words, the baking cup 300a can taper from the top opening 300a5 to the bottom surface 300a2. As such, in some implementations, a maximum width 300a4 of the top opening 300a5 can be larger than a maximum bottom width 300a9 of the bottom surface 300a2. This feature can assist in removing shortbread from the baking cavity 302 of the baking cup 300a. However, in other implementations, the width 300a4 of the top opening 300a5 can be about equal to the width 300a9 of the bottom surface 300a2. In some implementations, the top opening 300a5 and bottom surface 300a2 can define any polygon shape or other suitable shape. In some implementations, each of the baking cups 300a can have more than five side surfaces 300a7 or less than five side surfaces 300a7. In still other implementations, the baking cups 300a can have a varying number of side surfaces 300a7.

In some implementations, as shown in FIG. 5, the width 300a4 of the top opening 300a5 can be about one inch, and the width 300a9 of the bottom surface 300a2 can be about 0.5 inches. In some implementations, the baking cavities 302 of the baking cups 300a can be configured to receive and hold dough within the baking cavities 302 to bake the dough into a baked good. In some implementations, the dough can be a shortbread dough and the baked good can be a shortbread 600 (shown in FIG. 8). In some implementations, the shortbread dough can comprise butter, salt, sugar, and flour. In some implementations, the shortbread dough can comprise a mixture of approximately 30% butter, approximately 60% flour, approximately 9% sugar and approximately 1% salt as base ingredients for shortbread dough. In some implementations, other flavors or ingredients (e.g., chocolate, nuts, fruit, cinnamon, etc.) can be added to the shortbread dough to provide varying taste options. In some implementations, the dough can comprise butter, salt, sugar and flour, and does not include a rising agent. In some implementations, the dough does not include eggs. In some implementations, the dough can define a consistency that will not run though the apertures 300a1 in the bottom surfaces 300a2 of the baking cups 300a. In some implementations, the dough can be any other suitable type of dough and the baked good can be any other suitable baked good, such as, for example, muffins, cupcakes, other types of cookies, and the like.

Figure 7:
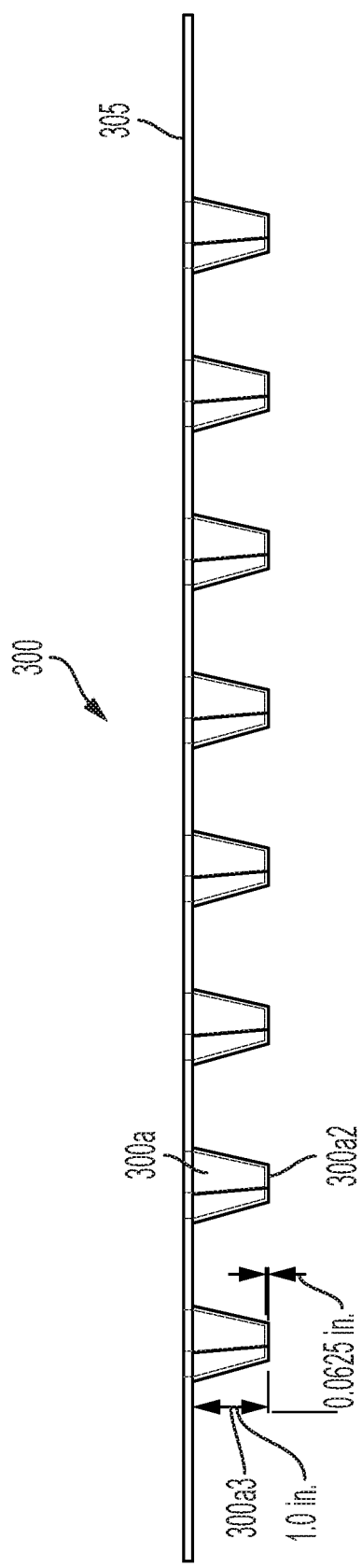
FIG. 7 is a side view of the baking tray of FIG. 3.

Referring to FIG. 7, in some aspects, a depth 300a3 of each of the baking cups 300a can be about one inch. In other aspects, the depth 300a3 of each baking cup 300a can be less than one inch, while in still other aspects, the depth 300a3 of each baking cup 300a can be greater than one inch. Furthermore, a thickness of the bottom surface 300a2 of the baking cup 300a can be about 1/16 (0.0625) inches. In other implementations, any of the dimensions of the baking cups 300a and baking tray 300 may be smaller or larger.

Figure 8:
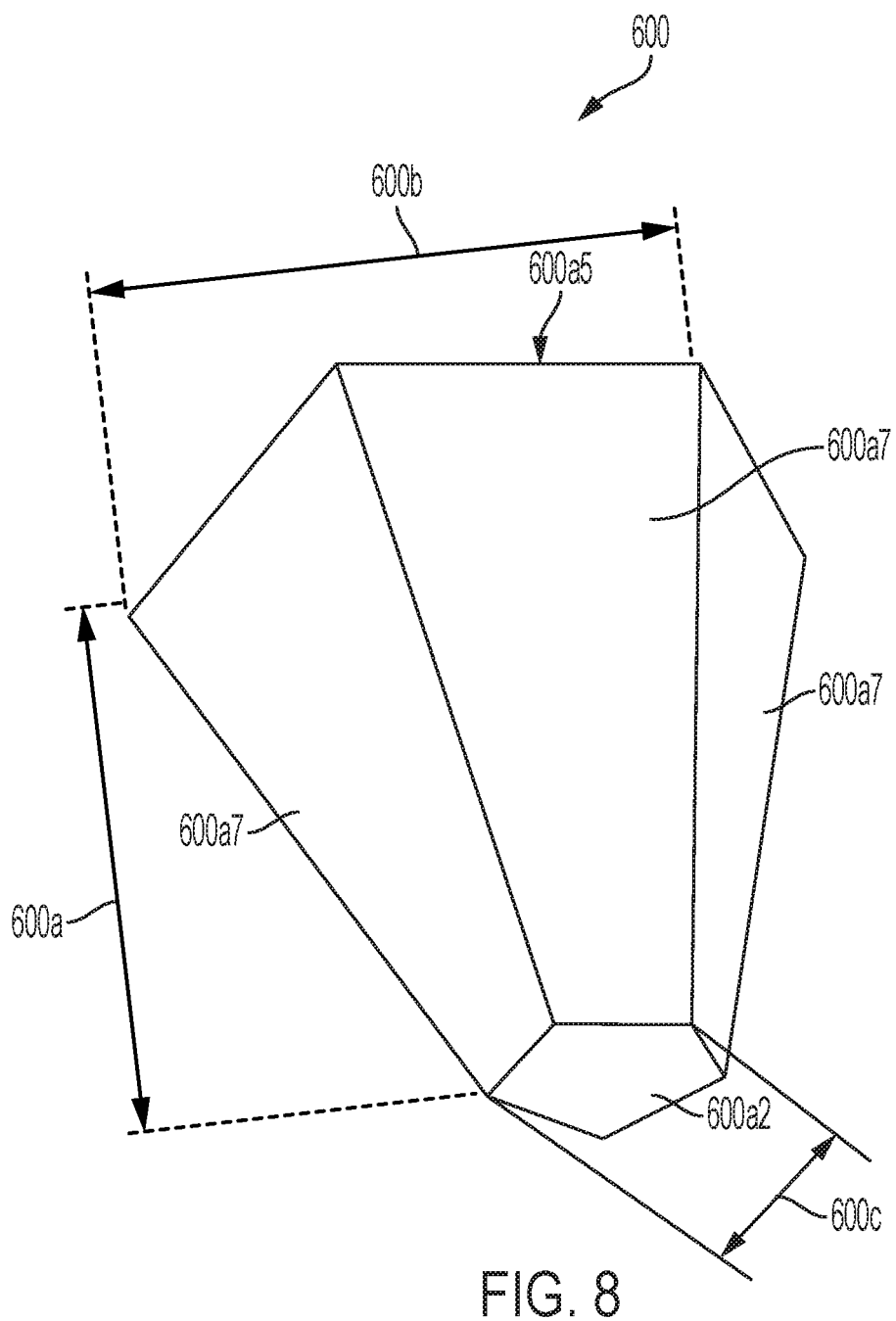
FIG. 8 is a perspective view of a shortbread formed by the baking tray of FIG. 3.

FIG. 8 illustrates the resulting baked good baked in one of the baking cavities 302 (shown in FIG. 3) of the baking tray 300 (shown in FIG. 3). In a particular aspect, the baked good can be a shortbread 600, as shown. Example aspects of the shortbread 600 can be configured to be generally bite-sized. The shortbread 600 can define a bottom shortbread surface 600a2, a top shortbread surface 600a5, and one or more side shortbread surfaces 600a7, which can generally correlate to the bottom surface 300a2 (shown in FIG. 5), top opening 300a5 (shown in FIG. 5), and side surfaces 300a7 (shown in FIG. 5), respectively, of a corresponding one of the baking cups 300a (shown in FIG. 3). In some implementations, the depth 300a3 (shown in FIG. 7) of the baking cups 300a can be configured to support and/or correspond to a height or vertical thickness 600a of the resulting shortbread 600 when a baking cavity 302 is filled with shortbread dough and the dough is baked according to baking instructions (described below). For example, in some implementations, the depth 300a3 of one of the baking cups 300a can be about one (1) inch, which can result in the corresponding shortbread 600 having a depth or vertical thickness 600a of one (1) inch or about one (1) inch when the baking cavity 302 is filled with shortbread dough and the dough is baked according to baking instructions. As shown, in the present aspect, the shortbread 600 can define a pentagonal frustum shape.

In some implementations, the baking cup depth 300a3 can be configured to result in shortbread 600 that has a depth or vertical thickness 600a of at least three-fourth (3/4) inches when the baking cavity 302 is filled with shortbread dough and baked according to baking instructions. In some implementations, the baking cup depth 300a3 can be configured to result in shortbread 600 that has a depth or vertical thickness 600a of greater than about three-fourth (3/4) inches and less than about one (1) inch when the baking cavity 302 is filled with shortbread dough and baked according to baking instructions. In some implementations, the baking cup depth 300a3 can be configured to result in shortbread 600 that has a depth or vertical thickness 600a of about one (1) inch or greater when the baking cavity 302 is filled with shortbread dough and baked according to baking instructions. In some implementations, the baking cup depth 300a3 can be configured to result in shortbread 600 that has any other suitable depth or vertical thickness 600a when the corresponding baking cavity 302 is filled with shortbread dough and baked according to baking instructions.

In some implementations, the width 300a4 of the top opening 300a5 of the baking cup 300a can be configured to support and/or correspond to a maximum width or horizontal thickness 600b of the resulting shortbread 600 when a corresponding one of the baking cavities 302 is filled with shortbread dough and the dough is baked according to baking instructions. For example, in some implementations, a width 300a4 of the top opening 300a5 of about one (1) inch can result in shortbread 600 having a maximum width or horizontal thickness 600b of one (1) inch or about one (1) inch when the baking cavity 302 is filled with shortbread dough and baked according to baking instructions. In some implementations, the width 300a4 can be configured to result in shortbread 600 that has a maximum width or horizontal thickness 600b of greater than about one (1) inch when the baking cavity 302 is filled with shortbread dough and baked according to baking instructions. In some implementations, the width 300a4 can be configured to result in shortbread 600 that has a maximum width or horizontal thickness 600b of less than about one (1) inch when the baking cavity 302 is filled with shortbread dough and baked according to baking instructions. In some implementations, the width 300a4 is configured to result in shortbread 600 that has any other suitable maximum width or horizontal thickness 600b when the baking cavity 302 is filled with shortbread dough and baked according to baking instructions.

Furthermore, the width 300a9 of the bottom surface 300a2 of each baking cup 300a can be configured to support and/or correspond to a minimum width or horizontal thickness 600c of the resulting shortbread 600 when a corresponding one of the baking cavities 302 is filled with shortbread dough and the dough is baked according to baking instructions. In one particular aspect, the minimum width or horizontal thickness 600c can be about one half (0.5) inches. In other aspects, the minimum width or horizontal thickness 600c can be less than or greater than one half (0.5) inches.

In some implementations, a cross-sectional interior shape 300a6 of the baking cup 300a can results in a shortbread 600 having the same cross-sectional interior shape 300a6 when the cavity 302 is filled with shortbread dough and the dough is baked according to baking instructions. For example, as shown in FIG. 5, in some implementations, a pentagonal cross-sectional interior shape 300a6 of the baking cup 300a can result in a pentagonal cross-sectional shape of the resulting shortbread 600 (shown in FIG. 8) when the cavity 302 is filled with shortbread dough and the dough is baked according to baking instructions. In the present aspect, each of the bottom surface 300a2 and the top opening 300a5 of the baking cup 300a can define a pentagonal shape.

In some implementations, the cross-sectional interior shape 300a6 of the baking cup 300a can define a complex shape, such as the pentagonal cross-sectional shape described above, a diamond or diamond-like cross-sectional shape. In some aspects, the baking cup 300a can also define a non-flat overall shape wherein at least one of the side surfaces 300a7 of the baking cup 300a is not oriented horizontally or vertically, a shape wherein one or more of the side surfaces 300a7 of the baking cup 300a can extend from the bottom surface 300a2 at an angle other than substantially perpendicular to the bottom surface 300a2 (e.g., an obtuse angle or an acute angle), and/or a shape where the side surfaces 300a7 extend from the bottom surface 300a2 of the baking cup 300a about 5/8 (0.625) inches or more. Furthermore, the shortbread 600 can define a shape where the horizontal thickness 600b changes with the height of the shortbread 600. In some implementations, the baking cup 300a can define a polygon-shaped top opening 300a5 and a polygon-shaped bottom surface 300a2 with the side surfaces 300a7 extending from the top opening 300a5 to the bottom surface 300a2. For example, the polygon-shaped top opening 300a5 and/or the polygon-shaped bottom surface 300a2 can define a triangle, a quadrilateral, a pentagon, a hexagon, or the like. In some implementations, the top opening 300a5, the bottom surface 300a2, and the cross-sectional interior shape 300a6 can comprise any other suitable shape. In some aspects, any or all of the surfaces 300a7,300a2 can be curved to form a shortbread 600 that is curved, rounded, or spheroidal in whole or in part. For example, in one aspect, the shortbread 600 can comprise a curved top shortbread surface 205 and a curved bottom shortbread surface (not shown), and the shortbread 600 can generally define a spheroidal shape.

In some implementations, the aperture 300a1 formed through each of the baking cups 300a can be configured to allow sufficient dry heat from a baking source (e.g., an oven) to enter the baking cavity 302 through the aperture 300a1 to penetrate sufficiently into a center of the shortbread dough in the baking cavity 302.

In some implementations, the aperture 300a1 of each baking cup 300a can be configured to reduce and/or eliminate a build-up or accumulation of moisture in the baking cavity 302, and thereby in the shortbread dough, during the baking of the shortbread dough into the shortbread 600. In this way, in some implementations, the aperture 300a1 can be configured to allow enough dry heat to consistently and sufficiently heat the shortbread dough during baking, by allowing sufficient dry heat to penetrate to the center of the shortbread dough to form or mold into the desired shortbread depth or vertical thickness 600a, shortbread width or horizontal thickness 600b, and/or overall shape of the shortbread 600 with the desired traditional shortbread texture. Furthermore, in this way, in some implementations, the aperture 300a1 can be configured to allow the shortbread dough to be appropriately baked into shortbread 600 comprising a vertical thickness 600a and/or a horizontal thickness 600b that is about five-eighth (⅝) inches or greater and/or comprising a complex overall shape, such as the pentagon-like shape of the shortbread 600 shown in FIG. 8 or the diamond-like shape of the shortbread 600 that would result from the baking tray 300 shown in FIG. 9, all while the shortbread 600 attains a desirable, traditional dry crumbly texture.

Figure 9:
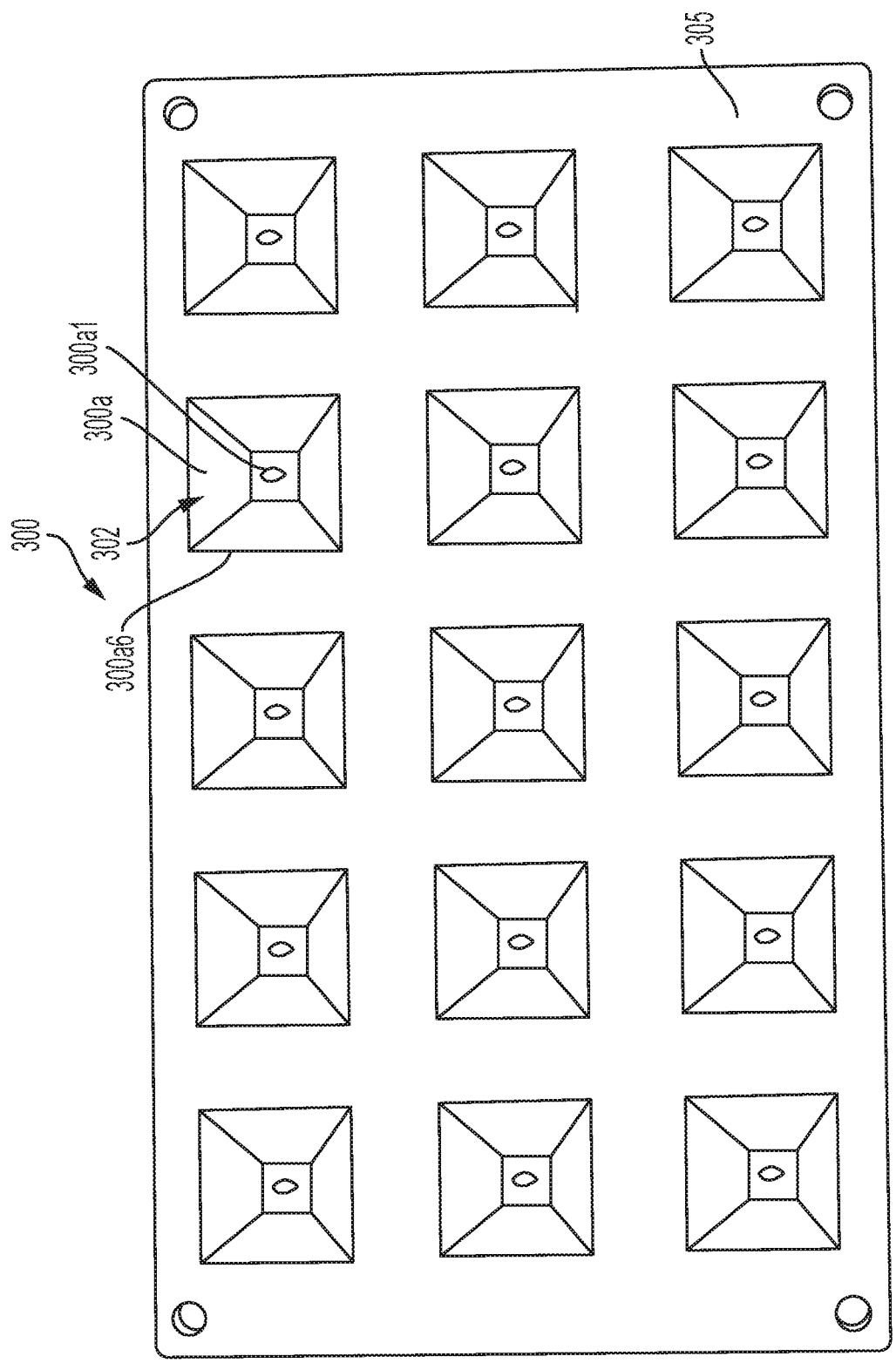
FIG. 9 is a top perspective view of the baking tray, according to another aspect of the present disclosure.

In some implementations, the aperture 300a1 can be circular, as shown in FIG. 5. In other implementations, the aperture 300a1 can define any other suitable shape, such as, for example, oval, as shown in FIG. 9, rectangle, or the like. Furthermore, any or all of the surfaces 300a7,300a2 can be curved, straight, or angled to form a shortbread 600 that is rounded, straight, or at an angle in whole or in part. In some implementations, the aperture 300a1 can be smaller than the top opening 300a5. In some implementations, the aperture 300a1 can be about the same size as the top opening 300a5. In some implementations, the aperture 300a1 can comprise a width or diameter 300a8 of about one-eighth (⅛) of an inch. For example, the width 300a8 of the aperture 300a1 can be between about 0.12 and 0.135 inches. In a specific aspect, as shown in FIG. 5, the width 300a8 can be about 0.13 inches. In this way, in some implementations, the aperture 300a1 can be large enough to allow sufficient dry heat into the baking cavity 302 and the center of the shortbread dough, as discussed above. In some implementations, the aperture 300a1 can be small enough and the dough can comprise a sufficient thickness or viscosity, such that the dough does not leak out of the baking cavity 302 through the aperture 300a1. In some implementations, multiple apertures 300a1 can be located on the bottom surface 300a2 and/or the side surfaces 300a7.

In other implementations, the aperture width or diameter 300a8 can be greater than one-eighth (⅛) of an inch. In still other implementations, the aperture width or diameter 300a8 can be less than one-eighth (⅛) of an inch. In some implementations, the aperture width or diameter 300a8 can be any suitable dimension.

In some implementations, one or more of the baking cups 300a can define more than one aperture 300a1 therethrough.

In some implementations, as shown in FIG. 5, the aperture 300a1 can be located at or near a center of the bottom surface 300a2. In some implementations, the aperture 300a1 can be located at any other suitable position on the bottom surface 300a2. In still other implementations, the one or more apertures 300a1 can be located at any other suitable position on the baking cup 300a, such as, for example, one of the side surfaces 300a7.

Figure 10:
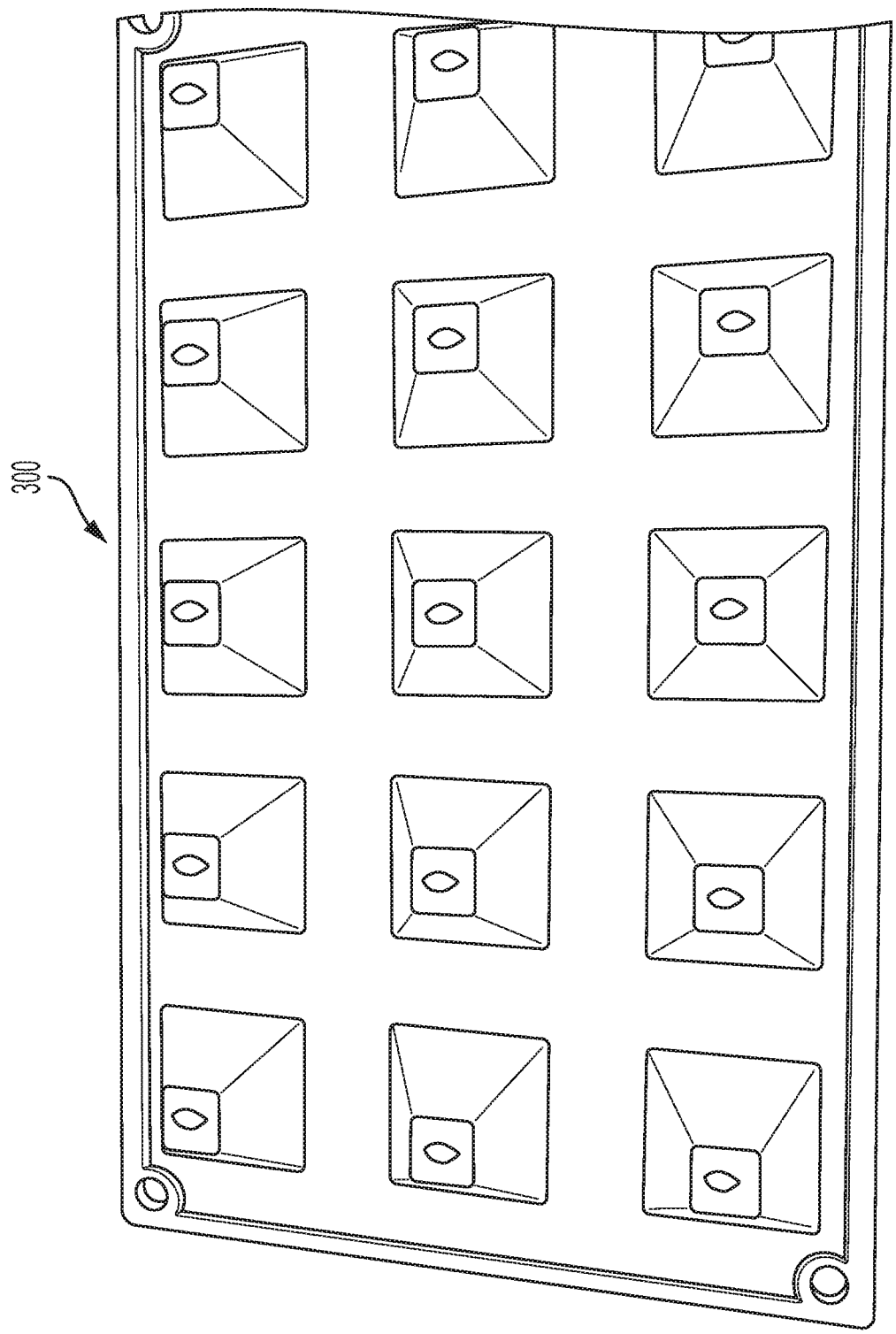
FIG. 10 is a bottom perspective view of the baking tray of FIG. 9.

FIGS. 9-11 illustrate another example implementation of the baking tray 300, according to the present disclosure. In some implementations, the baking tray 300 can comprise the same or similar elements, features, and functions as the baking tray 300 of FIG. 3. However, in the present aspect, the cross-sectional interior shape 300a6 of the baking cups 300a and the dimensions thereof can be different. For example, in the present aspect, the shape of the baking cups 300a can be a frustum shape, such as a square frustum shape, and the cross-sectional interior shape 300a6 can define a square or diamond shape, as shown. According to other aspects, the shape of the baking cups 300a and/or the resulting shortbread 600 (shown in FIG. 6) can be another frustum shape, a polyhedron such as a tetrahedron, an octahedron, and the like, a prism such as a triangular prism, a hexagonal prism, and the like, a spheroidal shape, a pyramid, a cone, or any other suitable complex shape. Furthermore, the cross-sectional interior shape 300a6 can define a circle, oval, triangle, rectangle, pentagon, or any other suitable cross-sectional shape.

As discussed above, the shortbread 600 can comprise a depth or vertical thickness 600a, a width or horizontal thickness 600b, and an overall complex shape and cross-sectional shape. For example, the diamond cross-sectional interior shape 300a6 of the baking cups 300a shown in FIG. 9 can result in a diamond cross-sectional shape of the shortbread 600 formed therein, and the pentagonal cross-sectional interior shape 300a6 of the baking tray 300 shown in FIG. 3 can result in a pentagonal cross-sectional shape of the shortbread 600, as shown in FIG. 8. As also discussed above, the vertical thickness 600a, horizontal thickness 600b, and cross-sectional shape of the shortbread 600 can correspond respectively to the depth 300a3, width 300a4, and cross-sectional interior shape 300a6 of the baking cup 300a of the baking tray 300 in which the shortbread 600 is baked. In some implementations, the vertical thickness 600a, horizontal thickness 600b, and cross-sectional shape of the shortbread 600 is not the same as the depth 300a3, width 300a4, and cross-sectional interior shape 300a6 of the baking cup 300a of the baking tray 300 in which the shortbread 600 is baked, wherein the differences can be attributable to baking affects as known by those of ordinary skill of the art when the corresponding baking cavity 302 is filled with shortbread dough and baked according to baking instructions.

In some implementations, as discussed above, the shortbread 600 can define a vertical thickness 600a that can be greater than about five-eighth (⅝) inches thickness. Furthermore, the shortbread 600 can define a complex overall shape and/or cross-sectional shape. Still further, the shortbread 600 can define a desirable traditional dry crumbly texture.

In some implementations, the shortbread 600 can define a vertical thickness 600a of at least about three-fourth (¾) inches. In some implementations, the shortbread 600 can define a vertical thickness 600a of at least about three-fourth (¾) inches and less than about one (1) inch. In some implementations, the shortbread 600 can define a vertical thickness 600a that is at least about one (1) inch or greater.

In some implementations, the shortbread 600 can define a horizontal thickness 600b of about one (1) inch. In some implementations, the shortbread 600 can define a horizontal thickness 600b of less than about one (1) inch. In some implementations, the shortbread 600 can define a horizontal thickness 600*b* of about one (1) inch or greater.

In some implementations, the shortbread 600 can define a vertical thickness 600*a* and/or a horizontal thickness 600*b* that are any other suitable dimension.

In some implementations, the baking tray 300 can define any suitable dimensions, such as the dimensions discussed above and/or shown in corresponding Figures.

In some implementations, the baking tray 300 can comprise of any suitable material and can be monolithically formed in various sizes or dimensions. For example, in some implementations, as discussed above, the baking tray 300 can comprise silicone. In a particular aspect, the baking tray 300 can be formed with liquid silicone rubber (LSR), or any other suitable material. For example, in other implementations, the baking tray 300 can comprise aluminum or stainless steel.

In some implementations, the baking tray 300 can comprise a non-stick coating. The non-stick coating material can be a fluoropolymer (e.g., Teflon) or any other non-stick material suitable for baking applications.

In some implementations, an example method of using the baking tray 300 can comprise inserting shortbread dough, or another suitable dough, into the one or more cavities 302 of the baking tray 300. In some implementations, the one or more cavities 302 can be completely filled with shortbread dough or another suitable dough, or the cavities 302 can be partially filled. In some instances, the cavities 302 can be partially filled to accommodate for various factors, such as the expansion of a dough that rises during baking (e.g., doughs that can include a rising agent).

In some implementations, as discussed above, the shortbread dough can be configured to comprise a sufficient thickness or viscosity and the aperture 300*a*1 can define a sufficient width or diameter 300*a*8, such that the dough does not leak out of the corresponding baking cavity 302 through the respective aperture 300*a*1. As discussed above, in some implementations the shortbread dough can comprise butter, flour, sugar and salt. In some implementations, the shortbread dough comprises approximately 30% butter, approximately 60% flour, approximately 9% sugar, and approximately 1% salt as base ingredients for the shortbread dough. In some implementations, other flavors or ingredients (e.g. chocolate, nuts, fruits, cinnamon, etc.,) can be added to the shortbread dough to provide varying taste options. In some implementations, the dough consists of butter, flour, sugar, and salt, and does not include a rising agent. In some implementations, the dough does not include eggs. Furthermore, in some implementations the dough does not include milk.

In some implementations, the method can comprise baking the shortbread dough. An oven (not shown) can be pre-heated to a desired temperature required to sufficiently bake the shortbread. For example, in some aspects, the desired oven temperature can be equal to or higher than about 300 degrees and equal to or lower than about 350 degrees, depending upon various factors, such as, for example, whether the shortbread dough is plain, or includes flavors or other ingredients as mentioned above. In some implementations, the oven temperature can be higher or lower. The shortbread dough can be placed within the baking cavities 302 of the baking tray 300, and the baking tray 300 can be placed into the oven for the appropriate amount of time needed. In some implementations, the dough can be cooked for more than about 10 minutes or less than about 30 minutes, again depending on various factors, such as whether the shortbread dough is plain, or includes flavors or other ingredients as mentioned above. In some implementations, the baking time can be shorter or longer depending on the temperature of the oven, the depth 300*a*3 of the baking cups 300*a*, the amount of dough placed in baking cavities 302, and any other factors known to those skilled in the art. Then, the baking tray 300 can be removed from the oven, and the baked shortbread 600 within each cavity 302 can be cooled for a period of time and can thereafter be removed from the one or more cavities 302.

In some implementations, the method can comprise removing the baked shortbread 600 from the one or more cavities 302 of the one or more baking cups 300*a* for storage, consumption, manufacturing, or other suitable action.

In some implementations, any other dough, or other suitable or desirable substance can be inserted into the one or more cavities 302 of the baking tray 300 for baking, storage, consumption, manufacturing, or other suitable action.

The figures, including photographs and drawings, comprised herewith may represent one or more implementations of the baking tray 300.

Details shown in the figures, such as dimensions, descriptions, etc., are exemplary, and there may be implementations of other suitable details according to the present disclosure.

Reference throughout this specification to "an embodiment" or "aspect", or "implementation" or words of similar import can mean that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations and/or methods may be depicted in the drawings in a particular order, this should not be understood as requiring that such operations and/or methods be performed in the particular order shown or in sequential order, or that all illustrated operations and/or methods be performed, to achieve desirable results One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A baking tray comprising:
a baking tray body; and
a baking cup formed in the baking tray body, the baking cup defining a baking cavity and an aperture formed through the baking cup, the baking cup comprising a cup sidewall, a planar, polygonal bottom surface, and a top opening opposite the bottom surface, the cup sidewall defining at least three planar side faces;
wherein a width of each of the planar side faces tapers from the top opening to the bottom surface, wherein a width of the baking cup at the top opening is greater than a width of the baking cup at the bottom surface, wherein each of the planar side faces are equal in depth, and wherein the depth of each planar side face is about equal to or greater than the width of the baking cup at the top opening.

2. The baking tray of claim 1, wherein the aperture is formed through the bottom surface of the baking cup.

3. The baking tray of claim 2, wherein a second aperture is formed through one of the planar side faces.

4. The baking tray of claim 1, wherein the aperture is formed through one of the planar side faces of the baking cup.

5. The baking tray of claim 1, wherein the bottom surface defines a bottom width of at least one half of an inch.

6. The baking tray of claim 1, wherein;
a depth of the baking cup is defined between the top opening and the bottom surface; and
the depth is equal to or less than one inch.

7. The baking tray of claim 1, wherein;
a depth of the baking cup is defined between the top opening and the bottom surface; and
the depth is equal to or more than one inch.

8. The baking tray of claim 1, wherein the top opening defines a polygon shape.

9. The baking tray of claim 1, wherein:
the cup sidewall comprises exactly five of the planar side faces;
the bottom surface defines a pentagonal shape.

10. The baking tray of claim 9, wherein the top opening defines a pentagonal shape.

11. The baking tray of claim 1, further comprising a second aperture formed through the baking cup.

12. The baking tray of claim 1, wherein the baking tray comprises silicone.

13. The baking tray of claim 1, wherein;
the baking cavity is configured to receive a shortbread dough therein; and
the baking tray is configured to bake a shortbread dough into a complex shortbread shape.

14. The baking tray of claim 1, wherein a width of the aperture is at least one eighth of an inch.

15. The baking tray of claim 1, wherein a width of the aperture is less than one eighth of an inch.

16. The baking tray of claim 1, wherein each of the planar side faces meet the planar polygonal bottom surface at a bottom linear edge.

17. The baking tray of claim 16, wherein each of the planar side faces meet an adjacent pair of the planar side faces a side linear edge.

* * * * *